United States Patent [19]

Wynnyckyj et al.

[11] Patent Number: 4,607,961
[45] Date of Patent: Aug. 26, 1986

[54] HEAT FLUX METER

[75] Inventors: John R. Wynnyckyj, Kitchener; Edward Rhodes, Waterloo, both of Canada

[73] Assignee: University of Waterloo, Waterloo, Canada

[21] Appl. No.: 557,327

[22] Filed: Dec. 2, 1983

[51] Int. Cl.[4] ............................................. G01K 13/00
[52] U.S. Cl. ....................................... 374/30; 374/180
[58] Field of Search ................... 374/30, 29, 134, 180, 374/179; 136/216, 213, 223, 228

[56] References Cited

U.S. PATENT DOCUMENTS

| | | | | |
|---|---|---|---|---|
| 2,677,711 | 5/1954 | Ray | ........................... | 136/216 |
| 3,131,304 | 4/1964 | Hager | ........................... | 374/30 |

FOREIGN PATENT DOCUMENTS

| | | | | |
|---|---|---|---|---|
| 0675473 | 12/1963 | Canada | ........................... | 374/179 |
| 0800714 | 1/1981 | U.S.S.R. | ........................... | 374/30 |

OTHER PUBLICATIONS

Gardon; An Instrument for Direct Measurement of Intense Thermal Radiation, 5–1953, pp. 366–370; Rev. of Scientific Instr.; vol. 24, No. 5.
Vacuum Thermopiles by Strong–Procedures in Experimental Physics; 1942.

*Primary Examiner*—Charles Frankfort
*Assistant Examiner*—Denis E. Corr
*Attorney, Agent, or Firm*—Sim & McBurney

[57] ABSTRACT

A heat flux meter for measuring heat flux in a hot environment, such as, a coal-fired boiler, includes a cup-shaped body member of one-piece construction having an internal cavity in which is mounted an annular thermoelectrically-dissimilar member from that of the body member and in heat and electrically conducting contact with the body member. Electrically conducting wires of the same metal as the annular member enter the cavity and are connected to the center of the circular portion of the body member and to the annular member. An e.m.f. is induced by the difference in temperature between the center of the disc portion and the annular member. Since the body member is of one piece construction and the heat flux meter is sealed to the walls of the boiler, gases from the hot environment cannot enter the cavity and cause failure of the meter.

15 Claims, 2 Drawing Figures

HEAT FLUX METER

FIELD OF INVENTION

The present invention relates to heat flux meters and the measurement of radiation heat flux.

BACKGROUND TO THE INVENTION

Heat flux meters have previously been described by Northover et al in J. Sci. Instrum., 1967, Vol. 44, pp 371-374. As described in that article, a heat flux meter intended for use in furnaces of steam generators comprises a cylindrical body member and a disc member joined to the cylindrical body. The assembly is mounted to a boiler wall, typically by welding, thereby forming an internal cavity.

The principle of operation of this heat flux meter is that heat flowing into the disc distributes radially to the cylindrical body and is then conducted to the boiler wall. The finite thermal resistance of the disc gives rise to a temperature difference between its centre and periphery. Upon attachment of suitable connecting wires to the disc centre and the cylindrical body, an e.m.f. is produced which is proportional to the magnitude of the disc radial temperature difference and, therefore, the heat flux. The connecting wires are constructed of the same material as the cylindrical body while the disc material is thermoelectrically-dissimilar to the cylindrical body material.

A connector tube of the same material as the meter body is joined to it by welding. When the flux meter is mounted in a boiler, both the body and the connector tube are welded to a boiler tube to provide a low resistance heat path through all parts of the meter system. The connecting tube is made long enough to protrude outside the boiler into a region at or near room temperature. The two connecting wires are lead through the connector tube to the interior of the flux meter. A seal is provided between the room temperature end of the connecting tube and the wires, so that a controlled atmosphere may be maintained in the meter cavity.

In this prior art heat flux meter, the disc member is joined to the cylindrical body by a thermoconductive solder, which is specified to be a silver-based solder in the Northover et al disclosure. An oxygen-free atmosphere must be maintained within the heat flux meter cavity to avoid destruction by oxidation of the various joints within the meter, in particular between the wires and the disc member and/or the body member. Heat flux meters are required to have a service life of, preferably, several years and over such extended periods of time, even the very slow ingress of corrosive elements may prove destructive.

It has now been found that these prior art heat flux meters are prone to failure upon extended periods of operation, especially when mounted in those regions of the boiler which experience the highest heat fluxes, namely the furnace walls in the vicinity of the burners. Examination of failed flux meters reveals corrosive attack at the joint between disc and body members and corrosive oxidative failure of the joint between the disc and the connecting wire. In the high heat flux service applications, the temperature of the disc centre rises several hundred degrees Celsius above the temperature of the tube walls. The disc may then be required to operate above the melting temperature of commercial silver-based solders.

Any junction between two dissimilar metals is known to be an area of enhanced corrosive attack. The presence of any solder layer, but in particular a silver-based solder at the interface of the disc and the body members, amplifies the effect. Silver, and liquid silver even more so than solid silver, has a high solubility for oxygen and sulfur, the two principal corrosive elements in the boiler atmosphere. As a result of this property, the silver solder layer acts as a preferred path for the diffusion of the corrosive atoms to reaction sites, so as to enhance the rate of corrosive attack.

While the applicant does not wish to be bound by any theory to explain the observed failures of the prior art heat flux meters, they are thought to occur by oxidation and destruction of the joint between the disc and body members as a result of corrosion at the high temperatures typically encountered in boilers. The concomitant ingress of oxygen and possibly sulfur into the flux meter cavity of the flux meter leads to corrosive attack upon joint between connecting wire and disc and ultimately destruction of the meter. Moreover, before destruction, corrosion at the disc/body solder joint increases the thermal resistance of the joint, resulting in an unstable heat flux versus e.m.f. calibration.

SUMMARY OF THE INVENTION

The present invention overcomes the prior art difficulties by a unique design, which results in a heat flux meter which is resistant to failure in long term use. In the present invention, those portions of the heat flux meter which are exposed to the combustion gases in the hot environment are constructed of a single piece of material and no joints are exposed to the combustion gases. By constructing a heat flux meter in this way, the prior art problems associated with exposure of the silver solder to the combustion gases and ingress of deleterious gases to the internal cavity are avoided.

In this way, a new method of measuring heat flux in an atmosphere in a closed space is provided. The novel method of the invention involves exposing a surface of thermoconductive material to the heat flux within the enclosed space and permitting the heat flux to impinge on the surface. A thermoelectrically-dissimilar material is positioned adjacent the periphery of the surface out of direct exposure to the heat flux and out of communication with the atmosphere in the enclosure. An e.m.f. thereby is established between the middle of the surface and the thermoelectrically-dissimilar material and is measured as a determination of the heat flux.

In accordance with the present invention, there is also provided a novel heat flux meter suitable for measuring heat flux by the generation of an e.m.f. proportional to the heat flux, comprising a plurality of elements. A generally cup-shaped one piece unitary construction body member is constructed of a material of relatively low thermal conductivity and comprises a generally planar circular top portion and a cylindrical wall portion extending therefrom to define an interior cavity to the body member. An annular member, constructed of a material, thermoelectrically-dissimilar to that of the body member, is mounted within the cavity in or near the corner between the circular top and the cylindrical wall. A pair of electrically-conducting wires of the same material as the annular member enters the cavity and is connected, one to the underside of the circular portion substantially at the centre thereof, and the other to the annular member.

By providing a one-piece body member and an internally-mounted annular member the potential problems of connective joints exposed to the corrosive components of combustion gases in a steam-generating furnace are avoided. When the heat flux meter of the invention is mounted to the furnace wall, the internal cavity is sealed off from the ingress of deleterious gases. In a preferred embodiment of the heat flux meter of the invention, the internal cavity is sealed by a plate of the same material of construction as the body member, welded to the cylindrical wall of the body member adjacent to the opposite end from the annular member.

The annular member may be mounted in the cavity in any convenient manner to establish a heat conducting relationship with the body member remote from the centre of the circular top portion to which one of the wires is attached. Preferably, the annular member is located in a complimentarily-shaped recess in the internal wall of the body member. Preferably, the annular member has a part-circular cross-section and is mounted in the recess by the use of high temperature stainless brazing materials, for example, nickel-chromium based brazing materials, such as those sold under the trademark "Nicrobraz". Such brazing materials also preferably are used to join the e.m.f. conducting wires to the centre of the circular top portion, and to the annular member.

Preferably, an oxygen and/or sulfur scavenger, for example, copper or titanium metal, is located in the cavity to ensure removal of any traces of oxygen which may be present therein or which may enter the cavity while in use. A ceramic or other thermally-stable inert filler material of low thermal conductivity preferably is positioned in the cavity to minimize the gas space and further to provide support for the annular member and the oxygen and/or sulfur scavenger.

DESCRIPTION OF PREFERRED EMBODIMENT

Figure 1:
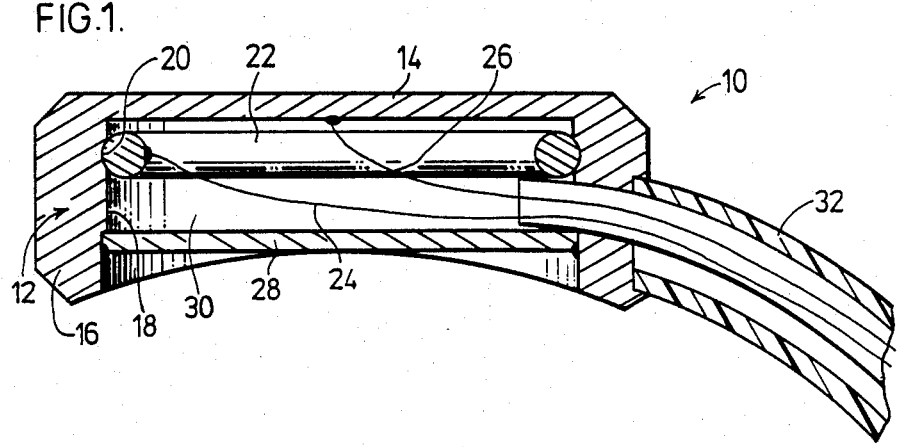
FIG. 1 is a sectional view of a heat flux meter constructed in accordance with the presently preferred embodiment of the invention, taken on line 1—1 of FIG. 2.
Figure 2:
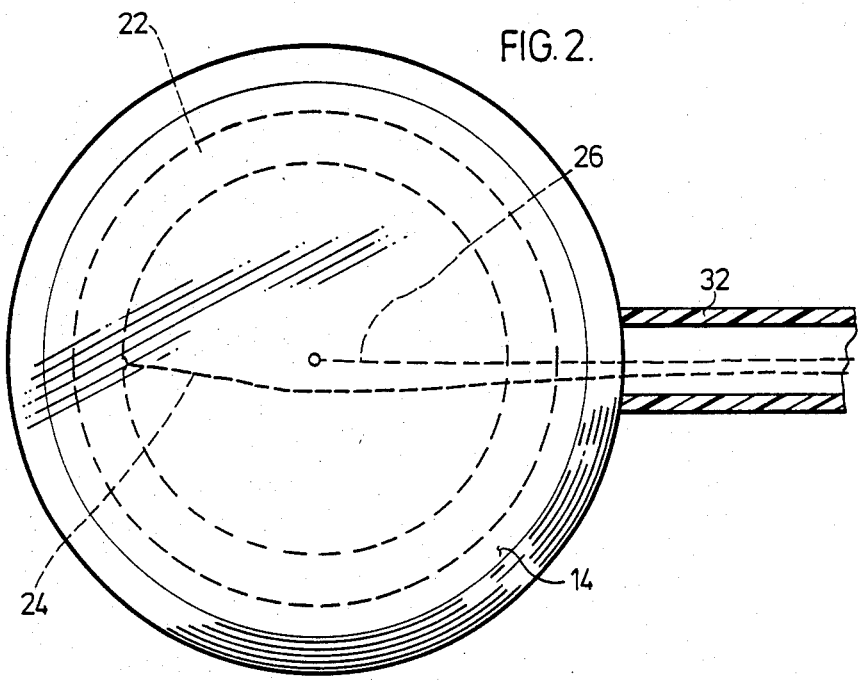
FIG. 2 is a plan view of the flux meter of FIG. 1.

Referring to the drawings, a heat flux meter 10 comprises a generally cup-shaped body member 12. The body member 12 is of one piece unitary construction and includes a planar circular top portion 14 and a cylindrical wall portion 16 depending from the planar top portion 12. The body member 12 may be constructed of any convenient construction material which withstands the temperatures of the operating environment of the heat flux meter 10 and which produces a thermal gradient between the centre and periphery of the disc portion 14. Preferred materials of construction include various stainless steels and those high temperature alloys sold for example, under the trademarks "Inconel", "Hastalloy", "Multimet" and "Haynes".

Located in the internal wall 18 of the cylindrical wall portion 16 is a part-circular recess 20 in which is received the periphery of an annular member or ring 22. Thermal contact between the ring 22 and the cylindrical wall portion 16 is achieved by brazing, preferably fluxless vacuum brazing using stainless brazes or other suitable joining procedure.

The annular ring 22 is constructed of thermally-conductive material which is thermoelectrically-dissimilar to that of the cup-shaped body member 12. Suitable materials of construction of the annular ring 22 include high nickel bearing alloys, for example, those sold under the trademarks "Constantan", "Alumel" and "Nickel D".

Electrically-conducting wires 24, 26 are connected, one (24) to the circular portion 14 adjacent its centre and the other (26) to the annular ring 22. The wires 24 and 26 usually are constructed of the same material as the annular ring 22 and may be connected to the respective elements by any suitable bonding method. Preferably, however, the connections, especially the connection to the circular member 14, are made with fluxless vacuum brazing using stainless brazes.

In addition to the wires 24, 26, an additional pair of wires (not shown) may also be connected one to the circular portion 14 adjacent its centre and the other to the annular ring 22 adjacent the location of the joint of the wire 24. This latter pair of wires is of a thermoelectrically-dissimilar material to the wires 24 and 26 and, in this way, provide thermocouples which may be used to measure the absolute temperature at the two locations.

A sealing cover 28 is welded to the lower end of the cylindrical wall portion 16 to define an enclosed cavity 30. The sealing cover 28 is preferably constructed of the same material as the cup-shaped body 12.

The connecting wires 22 and 24 extend into the cavity 30 through a connecting tube 32 which is intended to extend through the boiler wall to a room temperature environment. A suitable seal is provided at the room temperature end of the tube 32 to prevent the passage of gases to the cavity 30.

The recessed location of the cover 28 ensures that, upon mounting of the heat flux meter 10 to a furnace wall or the like, the joint between the cover 28 and the body 12 is not exposed to the gases located in the furnace.

The cavity 30 may be evacuated to provide a vacuum, may be filled with an inert gas, such as argon, or may be packed with a temperature-resistant inert filler material of low thermal conductivity, such as a ceramic material, which occupies substantially the whole space of the cavity 30. The use of a ceramic filler material also assists in providing support to the annular ring 22 and in spacing the wires 24 and 26 apart.

An oxygen and/or sulfur scavenger also may be positioned in the cavity 30 to ensure removal of residual oxygen and/or sulfur from the cavity and to provide long term protection against subsequent leakage of oxygen and/or sulfur gases into the cavity 30. Any suitable known oxygen-scavenging material may be utilized, such as, copper or titanium metal, in the form of fine wire mesh, powder or sponge. The oxygen scavenger material in fine powder form is preferably mixed with the ceramic powder in suitable proportions and located near the under surface of the circular member 14, where the temperatures are the highest.

The heat flux meter 10 comprises a few parts only, comprising the cup-shaped member 12, the annular ring 22, the cover 28, and the wires 24 and 26. The unitary nature of the cup-shaped member 12 and the preferred use of a ring 22 of circular cross-section permit ready formation and assembly of the flux meter, especially during mass production manufacture.

OPERATION

In operation, the heat flux meter 10 is mounted in an environment in which it is desired to measure the heat flux, for example, the region of the water walls of a boiler. Heat flux is received over the whole of the outer surface of the circular portion 14 of the cup-shaped member 12. By reason of the temperature difference between the centre of the circular portion 14 and the annular ring 22 and the inherent thermoelectric dissimilarity of the materials of construction of the two, an e.m.f. is induced between the centre of the circular portion 14 and the annular member 22, and is measured through the wires 24 and 26. The e.m.f. is proportional to the heat flux received by the meter 10.

The latter measurement may be used in systems to monitor and control ash formation on the walls of the boiler, such as is described in U.S. Pat. No. 4,408,586, or for any other convenient purpose.

SUMMARY OF DISCLOSURE

In summary of this disclosure, the present invention provides a novel heat flux meter of improved construction and a novel method of measuring radiation heat flux which do not suffer from the drawbacks of the prior art. Modifications are possible within the scope of the invention.

What we claim is:

1. A method of measuring heat flux in an atmosphere of combustion gases in an enclosed space, which comprises:

exposing a surface of a thermoconductive material to said heat flux and to said atmosphere of combustion gases within said enclosed space and permitting said heat flux to impinge on said surface to establish a temperature gradient between the middle of said surface and the periphery thereof, positioning a thermoelectrically-dissimilar material adjacent the periphery of said surface to form a thermoelectric junction with said thermoconductive material, said junction being wholly out of direct exposure to said radiation heat flux and wholly out of communication with the atmosphere of combustion gases in said enclosed space to establish an e.m.f. between the middle of the surface and said thermoelectrically-dissimilar material, and measuring said e.m.f. as a determination of said heat flux.

2. The method of claim 1, wherein said surface is a planar circular portion of a generally cup-shaped one-piece construction body member which is operably-located in said enclosed space to define an interior cavity which is wholly out of communication with said atmosphere and in which said thermoelectrically-dissimilar material in the form of an annular ring is wholly located.

3. The method of claim 2 wherein said e.m.f. is measured through a pair of electrically-conducting wires which extend from exterior the enclosed space into the interior cavity and which are joined one to the annular ring and the other to the underside of the planar circular portion adjacent the centre thereof.

4. The method of claim 3 wherein the absolute temperature in the interior cavity at the locations of join of the pair of electrically-conducting wires is also determined by providing a second pair of wires constructed of a material thermoelectrically-dissimilar to that of the first-mentioned pair of wires extending from exterior the enclosed space into the interior cavity and which are joined one to the annular ring adjacent the join of said one of the first-mentioned pair of wires thereto and the other to the underside of the planar circular portion adjacent the centre thereof.

5. A heat flux meter suitable for measuring heat flux in an atmosphere of combustion gases by the generation of an e.m.f. proportional to the heat flux, which comprises:

a generally cup-shaped one piece body member constructed of a thermally-conductive material comprising a planar circular portion exposed to said atmosphere of combustion gases and a cylindrical wall portion defining a cavity within the body member, an annular member constructed of a thermally-conductive material which is thermoelectrically-dissimilar to the thermally-conductive material of construction of the body member being mounted wholly in said cavity and wholly out of communication with the atmosphere of combustion gases in heat-conducting relationship with said body member, a pair of electrically-conducting wires of the same material of construction as the annular member entering said cavity and connecting one wire to the planar circular portion substantially at the centre thereof and the other wire to the annular member; and said annular member contiguous only with said other wire and said cylindrical wall portion.

6. The heat flux meter of claim 5, wherein said annular member has a part circular cross-section and is received in a complimentarily-shaped recess in said cylindrical wall portion adjacent the planar circular portion.

7. The heat flux meter of claim 6 wherein said annular member is brazed to said cylindrical ring portion by high temperature-resistant stainless brazing material.

8. The heat flux meter of claim 5 wherein said one wire is connected to said disc portion by high temperature-resistant stainless brazing material.

9. The heat flux meter of claim 5 including sealing cover means enclosing said cavity.

10. The heat flux meter of claim 9 wherein said sealing cover means is planar and is recessed within the open end of said cavity and joined to the internal wall of the cylindrical wall portion spaced from and parallel to said planar circular portion.

11. The heat flux meter of claim 9 including heat resistant inert filler material of low thermal conductivity substantially filling said cavity.

12. The heat flux meter of claim 5 including oxygen and/or sulfur getter means located in said cavity.

13. The heat flux meter of claim 12 wherein said getter means is located in said cavity immediately adjacent the underside of the planar circular portion of said cup-shaped member.

14. The heat flux meter of claim 5 further including an additional pair of electrically-conducting wires of a material thermoelectrically-dissimilar to that of the first-mentioned pair of wires and connected one to the planar circular portion substantially at the centre thereof and the other to the annular member adjacent the join thereto by the other of the first-mentioned pair of wires, thereby to establish thermocouples at said joints which may be used to determine the temperature thereat.

15. The heat flux meter of claim 5 wherein said pair of wires enters the cavity through said cylindrical wall portion.

* * * * *